United States Patent
Johnson et al.

(10) Patent No.: US 8,773,835 B2
(45) Date of Patent: Jul. 8, 2014

(54) ACTIVE MATERIAL ACTUATION UTILIZING MAGNETIC OVERLOAD PROTECTION

(75) Inventors: Nancy L. Johnson, Northville, MI (US); Alan L. Browne, Grosse Pointe, MI (US); Xiujie Gao, Troy, MI (US); Nilesh D. Mankame, Ann Arbor, MI (US); Paul W. Alexander, Ypsilanti, MI (US); Pablo D. Zavattieri, West Lafayette, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 289 days.

(21) Appl. No.: 13/421,828

(22) Filed: Mar. 15, 2012

(65) Prior Publication Data
US 2013/0242451 A1 Sep. 19, 2013

(51) Int. Cl.
*H01H 47/00* (2006.01)
(52) U.S. Cl.
USPC .......................................................... 361/144

(58) Field of Classification Search
USPC ........................ 361/139, 143–145, 206; 335/1
See application file for complete search history.

(56) References Cited

U.S. PATENT DOCUMENTS

| | | | |
|---|---|---|---|
| 7,905,538 B2 * | 3/2011 | Ukpai et al. ............... | 296/146.9 |
| 8,201,850 B2 * | 6/2012 | Browne et al. ............. | 280/801.1 |
| 2007/0247101 A1 * | 10/2007 | Noda et al. .................... | 318/582 |
| 2008/0272615 A1 * | 11/2008 | McKnight et al. ......... | 296/180.5 |
| 2009/0058130 A1 * | 3/2009 | Ukpai et al. ............... | 296/146.9 |
| 2010/0112924 A1 * | 5/2010 | Alexander et al. ............. | 454/70 |
| 2010/0176581 A1 * | 7/2010 | Usoro et al. ................. | 280/807 |
| 2010/0326070 A1 * | 12/2010 | Hao et al. ......................... | 60/527 |
| 2010/0332151 A1 * | 12/2010 | Hao et al. ......................... | 702/41 |
| 2011/0114434 A1 * | 5/2011 | Mankame et al. .............. | 192/35 |
| 2013/0240320 A1 * | 9/2013 | Browne ....................... | 192/84.9 |

* cited by examiner

*Primary Examiner* — Rexford Barnie
*Assistant Examiner* — Christopher Clark

(57) ABSTRACT

A system for and method of providing overload protection for an active material actuator, includes a magnetically functioning mechanism comprising, for example, one or more permanent or electromagnets, and/or magnetorheological fluid, and configured to produce a holding force less than the capacity of the actuator, and more preferably, a modifiable holding force responsive to load influencing conditions.

20 Claims, 2 Drawing Sheets

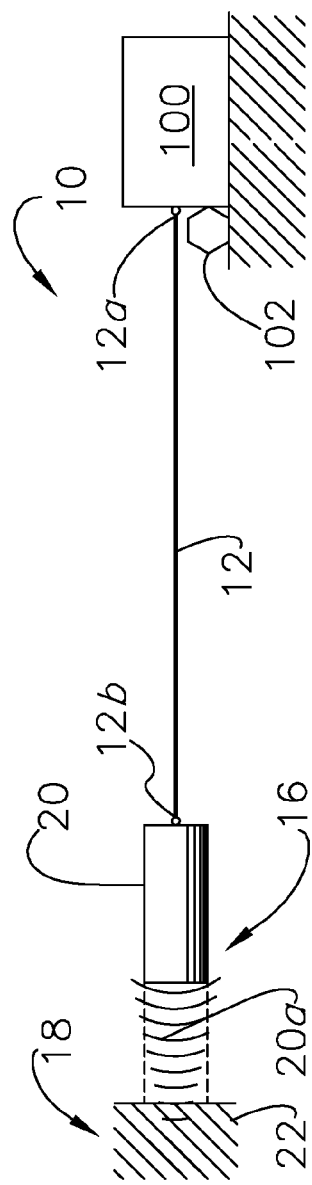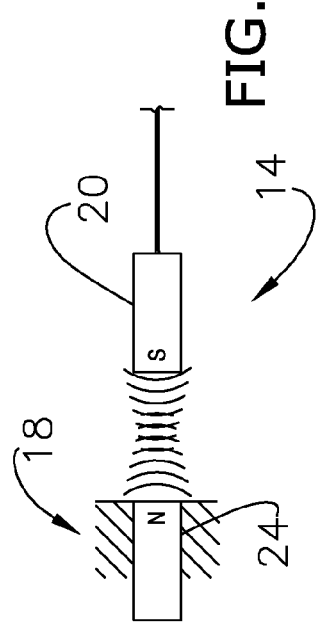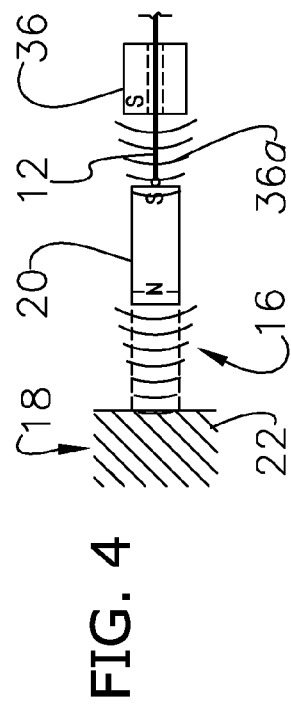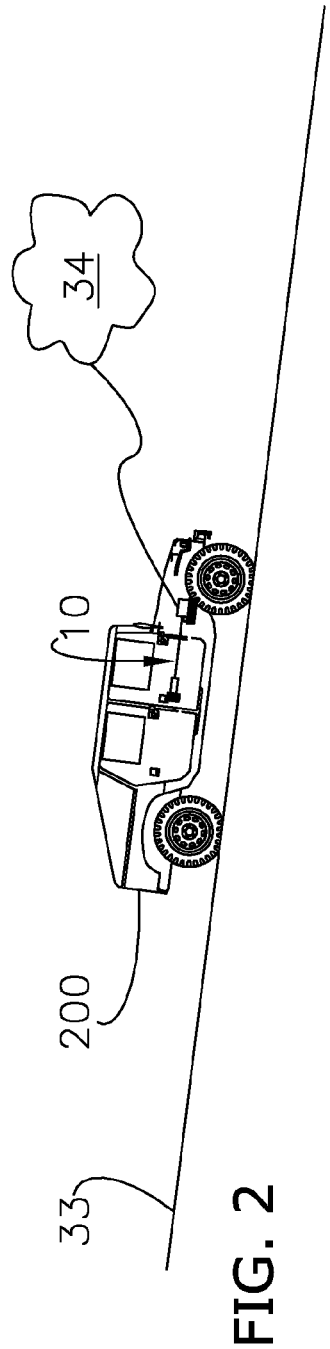

ACTIVE MATERIAL ACTUATION UTILIZING MAGNETIC OVERLOAD PROTECTION

BACKGROUND OF THE INVENTION

1. Field of the Invention

The present disclosure generally relates to methods and systems for controlling active material actuators, and more particularly, to methods of and systems for providing overload protection to an active material actuator, such as a shape memory alloy (SMA) wire, which employ magnetically functioning mechanisms.

2. Background Art

Active material actuators have long been used to do work in response to an activation signal. For example, where Martensitic shape memory alloy (SMA) wire actuators are heating to a prescribed temperature, the material is caused to undergo phase transformation, and the wire to contract in length. By contracting in length, the wire produces a driving force that can be used to manipulate a load. A common concern with SMA and other active material actuation, however, is overloading (i.e., applying an excess load above the structural capacity of the actuator) and in the case of SMA, overheating (i.e., applying an excess of heat energy above what is required to actuate the wire), which may result from overloading. It is well known that these conditions may damage the actuator and/or the driven device.

To protect against overloading, conventional active material actuation systems typically use mechanical springs, sometimes in combination with a micro-switch or photo-interruptor, to alleviate excess stress in the active material component. These mechanisms, however, present various concerns in the art, including, for example, increased overall actuator size, and increased overload thresholds over the stroke of the actuator, which may further damage the actuator. With respect to the latter, it is appreciated that the linear increase in spring modulus as a spring-based mechanism stretches causes a proportional increase in the overload force required for further displacement. Accordingly, there is a need in the art for a more compact and/or force-reducing method of providing overload protection to active material actuators.

BRIEF SUMMARY

The present invention concerns systems for and methods of providing overload protection for active material actuators that utilize magnetically functioning mechanisms to effect protection. Accordingly, the present invention is useful for preventing an overload condition, and reducing the likelihood of damaging the actuator and/or driven device as a result thereof. The invention is useful for providing a means of overload protection that reduces the driving force necessary to overcome overload protection over the stroke of the actuator. The invention is further useful for providing overload protection means that is permanently reusable, and in preferred embodiments autonomously resettable. That is to say by employing magnetism, the invention presents a useful life far greater than those offered by conventional overload protectors subject to creep and fatigue. Moreover, in preferred embodiments the invention offers tunable and selectively modifiable means of overload protection that take into consideration load influencing conditions. Thus, the performance and reliability of active material actuators are improved over a broader range of applications, environments, and conditions.

A first aspect of the invention concerns an active material actuation system adapted for driving a load over an actuation cycle, and preventing overload conditions during the cycle. The system includes an active material actuator having a work output end and a securing end. The actuator is drivenly coupled to the load, operable to apply a driving force to the load, and presents a load capacity. The system further includes fixed structure coupled to the actuator, and a magnetically functioning mechanism intermediate and physically coupled to the securing end and structure. The mechanism produces a holding force that acts to retain the securing end and structure in a relatively fixed condition, wherein the holding force is less than the capacity. Finally, the mechanism and actuator are cooperatively configured to selectively disconnect the structure and securing end when the driving force is greater than the holding force, so as to provide a secondary work output path.

Thus, a second aspect of the invention concerns a method of protecting an active material actuator from an overload condition during an actuation cycle. The method commences with the steps of drivenly coupling a work output end of the actuator to a load, and fixedly coupling a securing end of the actuator to a fixed structure using a magnetic field. Next, the actuator is activated, so as to produce a driving force directed towards the load and initiate the cycle. The field is overcome when the load is greater than the driving force, and the securing end is able to translate relative to the structure and present a secondary work output path, as a result of overcoming the field.

Other aspects and advantages of the present invention, including the employment of permanent magnets, electromagnets, and magnetorheological fluid to offer tunability, and the use of sensors and/or the global positioning system to determine and address load influencing conditions will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 1 is an elevation of an active material actuation system comprising a shape memory alloy wire actuator attempting to pull an obstructed load, and a triggered overload protector including a permanent magnet and ferrous material composing fixed structure, in accordance with a preferred embodiment of the invention;

FIG. 1a is a partial elevation of an active material actuation system comprising a shape memory alloy wire actuator, and overload protector including first and second permanent magnets fixedly coupled to the actuator and fixed structure, in accordance with a preferred embodiment of the invention;

FIG. 2 is an elevation of a vehicle upon a thoroughfare defining a slope and communicatively coupled to a global positioning system, wherein the vehicle includes an active material actuation system, in accordance with a preferred embodiment of the invention;

FIG. 4 is a partial elevation of an active material actuation system comprising a shape memory alloy wire actuator, overload protector including a permanent magnet, and a return mechanism presented by a permanent magnet, in accordance with a preferred embodiment of the invention.

DETAILED DESCRIPTION

Figure 3:
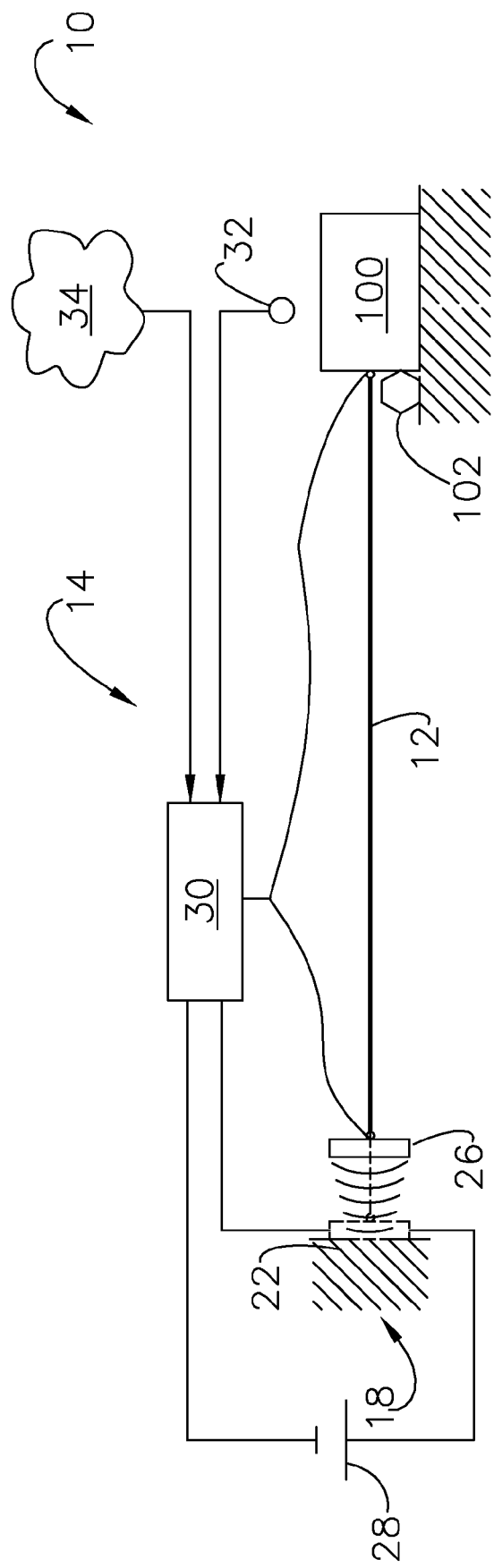
FIG. 3 is an elevation of an active material actuation system comprising a shape memory alloy wire actuator, an overload protector including an electromagnet, sensor, global positioning system, and fixed structure, in accordance with a preferred embodiment of the invention.

The following description and illustrated embodiments of the invention are merely exemplary in nature and in no way intended to limit the disclosure, its application, or uses. As shown in FIGS. 1-5, the present invention concerns a system 10 for and method of protecting an actuator 12 from an overload condition during an actuation cycle, wherein the mode of protection directly or indirectly employs magnetism. By implementation of the advantages herein described the system 10 may be used to more safely and reliably drive a load 100 in comparison to conventional actuators. The inventive system 10 may be used in any application or environment where active material actuation is desired, but subject to overloading, and that does not interfere with magnetic performance. For example, it is appreciated that a magnetic material presents a maximum operating temperature, above which the material may become demagnetized. An exemplary application is shown in FIG. 2, wherein the system 10 is employed by a vehicle 200, e.g., to safely drive a power seat, power window, door latch, or manipulable interior cabin feature (not shown).

The invention is particularly suited for use with active material actuators 12 (FIGS. 1-5), and more particularly, to shape memory alloy (SMA) wire actuators due to their cyclic life degradation when overloaded. As used herein the term "active material" shall be afforded its ordinary meaning as understood by those of ordinary skill in the art, and includes any material or composite that exhibits a reversible change in a fundamental (e.g., chemical or intrinsic physical) property, when exposed to an appropriate external signal source (e.g., electrical, magnetic, thermal and like fields). Suitable active materials for use with the present invention include shape memory materials, such as shape memory alloys, ceramics, and polymers, ferromagnetic SMA's, thin strips of piezoelectric uni- and bi-morphs, magnetorheological (MR) and electrorheological (ER) compositions, nanotube fibers, and electroactive polymer (EAP) diaphragms/tendons/roll actuators/etc. Shape memory materials generally refer to materials or compositions that have the ability to remember their original shape, which can subsequently be recalled by applying an external stimulus. As such, deformation from the original shape is a temporary condition. In this manner, shape memory materials can change to the trained shape in response to an activation signal.

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation.

Shape memory alloys exist in several different temperature-dependent phases. The most commonly utilized of these phases are the so-called Martensite and Austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

Returning to FIGS. 1-5, the system 10 generally includes an actuator 12 defining a primary work output end 12a and a securing end 12b, and an overload protector 14 further including a magnetically functioning mechanism 16. The actuator 12 is drivenly coupled to a load 100 at the output end 12a, and configured to produce a driving force suitable to manipulate the load 100 under normal conditions. That is to say, where SMA wire is used, the actuator 12 presents a morphology, diameter, and length necessary to effect the needed driving force and stroke. The actuator 12 further presents a structural capacity based in part on these characteristics, such as, for example, the maximum tensile strength of an SMA wire. As used herein the term "wire" is non-limiting, and shall include other similar geometric configurations presenting tensile load strength/strain capabilities, such as cables, bundles, braids, ropes, strips, chains, springs, and other elements. For the purposes of the present invention, it is appreciated that the driving force increases as activation signal (e.g., thermal energy) is added to the system 10, until reaching the structural capacity.

The actuator 12 is fixedly coupled to fixed structure 18 (e.g., the chassis of a vehicle) at the securing end 12b, so as to provide a base for generating and directing the driving force. Suitable structural, and electrically/thermally insulative or conductive means for interconnecting the actuator 12 and structure 18, such as an O-ring crimp, are readily discernable by those of ordinary skill in the art. It is within the ambit of the invention, however, to combine such means with the magnetically functioning mechanism (e.g., a permanent magnet) 16. To that end, an O-ring crimp or other reinforcing fastener may simply be magnetized or formed of magnetically interconnected parts, so as to provide magnetic overload protection with an adjacent ferrous material, as well as readily adjustable points of securement. The term "end" shall be used in a non-limiting sense, and shall encompass coupling the actuator 12 to the load 100 or fixed structure 18 at an interior point or along a surface. For example, where an SMA wire 12 presents a bowstring configuration, it is appreciated that the work output "end" is the intermediate vertex defined by the longitudinal profile of the wire 12.

As previously mentioned, the inventive system 10 further includes an overload protector 14 that primarily employs a magnetically functioning mechanism 16 to effect overload protection. The magnetically functioning mechanism 16 is intermediate and physically coupled to the securing end 12b and fixed structure 18, and produces a holding force that acts to retain the securing end 12b and structure 18 in a relatively fixed condition during normal operation. That is to say, the holding force works antagonistic to the driving force, but is greater than the latter under normal anticipatory loads. The holding force is less than the capacity, more preferably less than ninety percent of the capacity, and most preferably less than eighty percent of the capacity. As a result, the mechanism 16 is configured to selectively disconnect the structure 18 and actuator 12 when the driving force is greater than the holding force, which may result where an obstruction 102 (FIG. 1) prevents normal operation. Thus, overload protection is provided where the load 100 is greater than anticipated, by providing a secondary work output path at the securing end 12b.

The mechanism 16 may be adjacently attached to the actuator 12 and/or structure 18, or spaced from either where necessary to effect the intended function of the invention (e.g., where the active material actuator 12 responds to a magnetic or thermal activation signal). In its simplest form, the mechanism 16 consists essentially of a permanent magnet 20 (FIG. 1) fixedly coupled to or composing the securing end 12b or structure 18, and ferrous material 22, such as steel, fixedly coupled to or composing the other. Here, it is appreciated that the magnetically hard material that forms the magnet 20, as well as the dimensions of the magnet 20 are selected such that a magnetic field 20a of sufficient strength is produced to effect the necessary holding force. Alternatively, a second permanent magnet 24 may be used to engage the first magnet 20. In a bar configuration (FIG. 1a), it is appreciated that the adjacent poles of the magnets 20,24 are opposite, so as to attract one another. Again, the magnets 20,24 are cooperatively selected and sized such that the combined magnetic field produces a holding force less than the capacity of the actuator 12. It is appreciated that by using multiple magnets 20,24, the size and strength of the magnets 20,24 may be reduced.

The preferred mechanism 16 is selectively adjustable, so as to provide a tunable, self-correcting system 10 that may be applied to multiple loads. In this regard, the mechanism 16 preferably includes an electromagnet 26 as shown in FIG. 3, which is tuned by controlling its input signal. The electromagnet 26 may be fixedly coupled to or compose the securing end 12b or structure 18, while ferrous material 22, such as steel, is fixedly coupled to or composes the other. Alternatively, a permanent magnet 20 may be fixedly coupled to or compose the other, so as to save power while maintaining tunability. Here, the overload protector 14 further includes an electric power source 28 communicatively coupled to the electromagnet 26 and a controller 30 intermediate the source 28 and electromagnet 26. The preferred controller 30 is programmably configured to further control activation of the actuator 12 (FIG. 3), so as to coordinate an increase in overload protection, only when needed.

To that end, the preferred overload protector 14 further includes a sensor 32 operable to detect a load influencing condition. The preferred sensor 32 is communicatively coupled to the mechanism 16 through the controller 30 (FIG. 3). The mechanism 16, controller 30 and sensor 32 are cooperatively configured to adjust the holding force responsive to the condition. Exemplary conditions include the slope of the actuator 12 as it relates to gravitational influence upon the load 100. That is to say, the preferred system 10 is configured to adjust the holding force as is necessary to effect overload protection, where, for example, a vehicle 200 travels upon a sloped thoroughfare 33 (FIG. 2). It is appreciated that where the driving force acts against gravity the load 100 will be greater than the anticipatory load horizontally limited to static and kinetic friction. The corresponding increase in holding force may be calculated based upon the trigonometric relationship of the weight contributing to the load 100. Other conditions include the acceleration or deceleration being experienced by the load 100, a crash or pre-crash event that may predict the former, or the ambient temperature, atmospheric pressure, presence of lubrication, and/or surrounding fluid characteristics (e.g., laminar versus turbulent flow) that may affect the ability of the load 100 to be manipulated. For example, it is appreciated that a lubricated load 100 may be greater in relatively lower temperatures. More preferably, the control algorithm includes a condition threshold, such that the controller 30 is configured to autonomously adjust the holding force only when the condition exceeds the threshold. For example, for slopes less than 10% the influence of weight may be deemed negligible, such that modification of the holding force is withheld.

Alternatively, or in addition to one or more sensors 32, the global positioning system (GPS) 34 or equivalent may be communicatively coupled to the mechanism 16 through the controller 30, and a receiver (not shown). In this configuration, GPS may be used to supply load influencing condition data (FIGS. 2 and 3). For example, GPS 34 may be used to determine the geographic location of the actuator 12, and the slope of the actuator 12 at the location. In a vehicular application, the controller 30 and GPS 34 may be employed to determine the location of the actuator 12 upon a thoroughfare 33, and then used to determine the slope of the thoroughfare 33 at the location (e.g., via a look up table, or calculations utilizing sequential points). The holding force may then be autonomously adjusted responsive to a slope that acts against the driving force.

The preferred system 10 is configured to autonomously reset the overload protector 14 by causing the structure 18 and securing end 12b to become fixedly re-coupled when the overloading event ceases. To that end, it is certainly within the ambit of the invention to utilize a two-way shape memory actuator 12 that re-engages the overload protector 14 upon cessation of the initial activation signal. Moreover, it is appreciated that a sufficient weight of the magnet 20 or ferrous material 22, when at least a component of the driving force vector is directed upward, may act as a return force that resets the mechanism 16. For example, the weight of the magnet 20 may be used to cause an SMA wire 12, once deactivated, to stretch and the ferrous material 22 of the fixed structure 18 to re-enter the magnetic field 20a (or vice-versa), so as to further stretch the wire 12. It is appreciated that this results in an automatic method of pre-straining the wire 12 advantageous for normal use. In another mode, the magnet 20 may be configured such that the secured end 12b remains under the attractive influence of the field 20a throughout the actuator stroke, so that upon cessation of the driving force (and deactivation of the wire) the field 20a causes translation to reverse.

More preferably, the preferred overload protector 14 may include an external return mechanism 36 drivenly coupled to the securing end 12b, and antagonistic to the driving force. In keeping with the theme of the invention, the return mechanism 36 may be a permanent magnet opposite the structure 18, and oriented to produce a field 36a repellant to the overload magnet 20 or 26. In FIG. 4, for example, a cylindrical magnet 36 is shown coaxially aligned with the wire 12. The repellant magnet 36 is preferably positioned so as to magnetically engage the like pole of the magnet 20 at the point of translation where the magnet 20 no longer attracts the fixed structure 18. As a result, a smaller magnet 20 that does not magnetically engage the ferrous material along the full stroke of the actuator 12 may be used. Moreover, it is appreciated that the repellant force 36a promotes a more rapid transformation of the Austenitic wire 12 back to the more malleable Martensitic phase. Alternatively, it is appreciated that an external compression spring or other biasing member (not shown) may be used in lieu of the repellant magnet 36.

Figure 5:
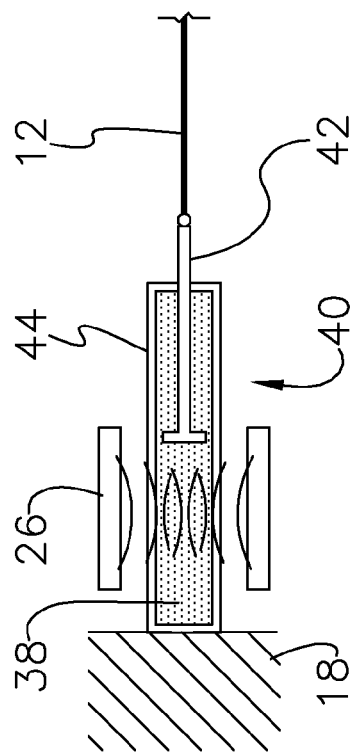
FIG. 5 is a partial elevation of an active material actuation system comprising a shape memory alloy wire actuator, an overload protector including a magnetorheological fluid disposed within a dashpot, and electromagnets magnetically engaging the fluid, in accordance with a preferred embodiment of the invention.

In another embodiment of the invention, the mechanism 16 includes a magnetorheological fluid 38 defining a yield strength that is selectively modified to effect overload protection. For example, the fluid 38 may be disposed within a dashpot 40 having its piston 42 drivenly coupled to the actuator 12 and its cylinder 44 securely coupled to fixed structure 18 (FIG. 5). The holding force is produced by the yield strength of the fluid 38, as it engages the piston 42, and indirectly by a magnetic field engaging the fluid 38. To that end, it is appreciated that the yield strength of the MR fluid 38 is substantially (e.g., more than 50%) increased when exposed to the magnetic field, and more preferably, to a state of exhibiting viscoelastic behavior. As such, to effect the intended function of the invention, a magnetic field may be left "ON" under normal operation to fix the secured end 12b of the actuator 12, and discontinued when an overload condition is sensed, so as to enable the secured end 12b to translate. An external magnetic field may generally be produced via soft-magnetic core electromagnets 26 in proximity to the dashpot 40 (FIG. 5), or by a pair of Helmholtz coils for faster response.

Suitable magnetorheological fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size is preferably selected so that the particles exhibit multi-domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used, wherein the amount of bentonite or hectorite in the MR fluid is preferably less than or equal to about 10 percent by weight of the total MR fluid, more preferably less than or equal to about 8.0 percent by weight, and most preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Finally, optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Suitable algorithms, processing capability, and sensor inputs are well within the skill of those in the art in view of this disclosure. This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. An active material actuation system adapted for driving a load over an actuation cycle, and preventing an overload condition during the cycle, said system comprising:
   an active material actuator operable to undergo a reversible transformation in fundament property when exposed to or occluded from an activation signal, having a work output end and a securing end, configured to apply a driving force to the load, and presenting a load capacity;
   a fixed structure coupled to the actuator; and
   a magnetically functioning mechanism intermediate and physically coupled to the securing end and structure,
   said mechanism producing a holding force acting to retain the securing end and structure in a relatively fixed condition,
   said holding force being less than the capacity,
   said mechanism being configured to selectively disconnect the structure and securing end when the driving force is greater than the holding force, so as to provide a secondary work output path.

2. The system as claimed in claim 1, wherein the mechanism is adjacently attached to the actuator and/or structure.

3. The system as claimed in claim 1, wherein the holding force is selectively adjustable.

4. The system as claimed in claim 3, wherein the mechanism and structure alternatively include an electromagnet, and ferrous material communicatively coupled to the electromagnet.

5. The system as claimed in claim 3, wherein the mechanism includes a magnetorheological fluid defining a selectively modifiable yield strength, and the holding force is produced by the yield strength.

6. The system as claimed in claim 1, wherein the mechanism and structure alternatively include a permanent magnet, and ferrous material communicatively coupled to the magnet.

7. The system as claimed in claim 6, wherein the mechanism further includes an electromagnet.

8. The system as claimed in claim 1, further comprising:
   a sensor operable to detect a load influencing condition, and communicatively coupled to the mechanism,
   said holding force being autonomously adjustable and responsive to the condition.

9. The system as claimed in claim 8, wherein the condition is selected from the group consisting essentially of the slope of the actuator, the acceleration or deceleration of the load, a crash event, a pre-crash event, the ambient temperature, atmospheric pressure, lubrication presence, and surrounding fluid characteristic.

10. The system as claimed in claim 8, further comprising:
a controller communicatively coupled to and intermediate the sensor and mechanism, and having stored thereupon a condition threshold,
said controller, sensor, and mechanism being cooperatively configured to autonomously adjust the holding force only when the condition exceeds the threshold.

11. The system as claimed in claim 1, further comprising:
a global positioning system communicatively coupled to the mechanism, and operable to determine the geographic location of the actuator upon a thoroughfare, and the slope of the thoroughfare at the location,
said holding force being autonomously adjustable and responsive to the slope.

12. The system as claimed in claim 1, further comprising:
an external return mechanism drivenly coupled to the securing end and antagonistic to the driving force, so as to autonomously cause the structure and securing end to be fixedly re-coupled when a driving force greater than the holding force ceases.

13. The system as claimed in claim 12, wherein the return mechanism includes a magnet opposite the fixed structure.

14. A method of protecting an active material actuator from an overload condition during an actuation cycle, said method comprising:
a) drivenly coupling a work output end of the actuator to a load;
b) fixedly coupling a securing end of the actuator to a fixed structure using a magnetic field;
c) activating the actuator, so as to produce a driving force directed towards the load and initiate the cycle;
d) overcoming the field when the load is greater than the driving force; and
e) enabling the securing end to translate relative to the structure and present a secondary work output path, as a result of overcoming the field.

15. The method as claimed in claim 14, wherein step b) further includes the steps of determining a load influencing condition, and modifying the field responsive to the condition.

16. The method as claimed in claim 15, wherein step b) further includes the steps of determining a condition selected from the group consisting essentially of the slope of the actuator, the acceleration or deceleration of the load, a crash event, a pre-crash event, the ambient temperature, atmospheric pressure, lubrication presence, and a surrounding fluid characteristic.

17. The method as claimed in claim 15, wherein step b) further includes the steps of comparing the condition to a threshold, and modifying the field only when the condition exceeds the threshold.

18. The method as claimed in claim 14, wherein step b) further includes the steps of determining a location of the actuator upon a thoroughfare, determining the slope of the thoroughfare at the location, and modifying the field responsive to the slope.

19. The method as claimed in claim 14, wherein step d) further includes the steps of detecting, and selectively reducing the field, when the load is greater than the driving force.

20. The method as claimed in claim 14, further comprising:
f) deactivating the actuator, and autonomously reversing the translation and causing the securing end and structure to be fixedly re-coupled using a second magnetic field.

* * * * *